United States Patent
Kubota et al.

(10) Patent No.: US 7,172,202 B2
(45) Date of Patent: Feb. 6, 2007

(54) SPHERICAL ANNULAR SEAL MEMBER AND METHOD OF MANUFACTURING THE SAME

(75) Inventors: Shuichi Kubota, Fujisawa (JP);
Takeshi Furukido, Fujisawa (JP);
Yoshikazu Sakairi, Fujisawa (JP)

(73) Assignee: Oiles Corporation, Tokyo (JP)

( * ) Notice: Subject to any disclaimer, the term of this patent is extended or adjusted under 35 U.S.C. 154(b) by 47 days.

(21) Appl. No.: 10/487,740

(22) PCT Filed: Sep. 18, 2002

(86) PCT No.: PCT/JP02/09556

§ 371 (c)(1),
(2), (4) Date: Feb. 25, 2004

(87) PCT Pub. No.: WO03/027544

PCT Pub. Date: Apr. 3, 2003

(65) Prior Publication Data

US 2004/0207162 A1    Oct. 21, 2004

(30) Foreign Application Priority Data

Sep. 21, 2001    (JP)    ............................. 2001-289516

(51) Int. Cl.
*F16J 15/12*    (2006.01)
(52) U.S. Cl. ...................... 277/651; 277/650; 277/627
(58) Field of Classification Search ............... 277/611, 277/627, 650, 651–654
See application file for complete search history.

(56) References Cited

U.S. PATENT DOCUMENTS 4,547,434 A * 10/1985 Sumiyoshi et al. ......... 428/609
4,551,393 A * 11/1985 Sumiyoshi et al. ......... 428/609

(Continued)

FOREIGN PATENT DOCUMENTS

FR    2696804    4/1994

(Continued)

OTHER PUBLICATIONS

European Search Report for EP 06 02 0491, Mailed Nov. 3, 2006 (2 pages).

*Primary Examiner*—Patricia Engle
*Assistant Examiner*—Gilbert Lee
(74) *Attorney, Agent, or Firm*—Nixon & Vanderhye P.C.

(57) ABSTRACT

A spherical annular seal member (1) has a seal body (4) in which a heat-resistant material (2) and a reinforcing member (3) made of a metal wire have been compressed to fill meshes of the metal wire net of the reinforcing member (3) with the heat-resistant material (2) such that the heat-resistant material (2) and the reinforcing member (3) are integrally formed in mixed form. The seal body (4) has a cylindrical inner peripheral surface (6) defining a through hole (5); an outer peripheral surface (10) constituted by a partially convex spherical surface (7); and annular end faces (8, 9) respectively provided on a large-diameter side and a small-diameter side of the partially convex spherical surface (7). In the seal body (4), the reinforcing member (3) and the heat-resistant material (2) are respectively contained at a rate of 15 to 80 wt. % and at a rate of 20 to 85 wt. %. The heat-resistant material (2) in the seal body (4) has a density of 1.20 g/cm³ to 2.00 g/cm³.

10 Claims, 11 Drawing Sheets

U.S. PATENT DOCUMENTS

| | | | |
|---|---|---|---|
| 4,607,851 A | | 8/1986 | Usher |
| 4,951,954 A | * | 8/1990 | MacNeill .................... 277/627 |
| 5,451,064 A | | 9/1995 | Mercuri et al. |
| 5,499,825 A | * | 3/1996 | Maeda et al. ............... 277/626 |
| 5,615,479 A | * | 4/1997 | Maeda et al. .............. 29/888.3 |
| 5,909,881 A | * | 6/1999 | Segawa ...................... 277/627 |
| 5,997,979 A | * | 12/1999 | Kashima .................... 428/66.4 |
| 6,116,611 A | | 9/2000 | Ozaki et al. |
| 6,152,453 A | * | 11/2000 | Kashima et al. ............ 277/404 |
| 6,889,983 B2 | * | 5/2005 | Murakami et al. .......... 277/627 |
| 2002/0190483 A1 | * | 12/2002 | Murakami et al. .......... 277/627 |

FOREIGN PATENT DOCUMENTS

| | | |
|---|---|---|
| GB | 2271398 | 4/1994 |
| GB | 2327199 | 1/1999 |
| JP | 1-299393 | 12/1989 |
| JP | 6-123362 | 5/1994 |
| JP | 11-037161 | 2/1999 |

* cited by examiner

SPHERICAL ANNULAR SEAL MEMBER AND METHOD OF MANUFACTURING THE SAME

This application is the US national phase of International Application No. PCT/JP02/09556 filed 18 Sep. 2002, which designated the US. PCT/JP02/09556 claims priority to JP Application No. 2001-289516 filed 21 Sep. 2001. The entire contents of these applications are incorporated herein by reference.

TECHNICAL FIELD

The present invention relates to a spherical annular seal member used in a spherical pipe joint for an automobile exhaust pipe, as well as a method of manufacturing the same.

BACKGROUND ART

Various spherical annular seal members used in spherical pipe joints for automobile exhaust pipes have been disclosed in, for example, JP-A-54-76759, JP-A-6-123362, JP-A-10-9396, JP-A-10-9397, and the like.

As compared with a bellows-type joint, each of the proposed spherical annular seal members is capable of reducing the manufacturing cost and excels in durability. However, each of these spherical annular seal members is formed such that a heat-resistant material formed of expanded graphite and the like and a reinforcing member made from a metal wire net are compressed to fill meshes of the metal wire net of the reinforcing member with the heat-resistant material such that the heat-resistant material and the reinforcing member are integrally formed in mixed form. Therefore, in addition to the problem of leakage of exhaust gases through the spherical annular seal member itself due to such as the proportion of the reinforcing member to the heat-resistant material and the degree of compression of the heat-resistant material and the reinforcing member, there is an inherent problem in that abnormal noise can occur due to the presence of the heat-resistant material at the partially convex spherical surface which slidably abuts against a mating member. For example, if the proportion of the reinforcing member to the heat-resistant material is excessively large, or the degree of pressurization of the heat-resistant material is low, the degree of sealing by the heat-resistant material with respect to infinitesimal passages occurring around the reinforcing member declines, resulting in initial leakage. Moreover, there is a possibility of early leakage of exhaust gases due to such as the oxidation and wear of the heat-resistant material at high temperatures. In addition, if the heat-resistant material at the partially convex spherical surface has been pressurized to a high degree, or the proportion of exposure of the heat-resistant material with respect to the reinforcing member at the partially convex spherical surface is extremely large, stick-slip can result, possibly causing the occurrence of abnormal noise.

The present invention has been devised in view of the above-described aspects, and its object is to provide a spherical annular seal member which makes it possible to eliminate the leakage of exhaust gases through the spherical annular seal member itself, and which makes it possible to eliminate the occurrence of abnormal noise and has a stable sealing characteristic, as well as a method of manufacturing the same.

DISCLOSURE OF THE INVENTION

A spherical annular seal member according to a first aspect of the invention comprises: a seal body which has an annular sliding surface and in which at least a heat-resistant material and a reinforcing member made of a metal wire have been compressed to fill meshes of the metal wire net of the reinforcing member with the heat-resistant material such that the heat-resistant material and the reinforcing member are integrally formed in mixed form, wherein the reinforcing member and the heat-resistant material are respectively contained at a rate of 15 to 80 wt. % and at a rate of 20 to 85 wt. %, and the heat-resistant material in the seal body has a density of 1.20 g/cm$^3$ to 2.00 g/cm$^3$.

In the seal body in which a heat-resistant material and a reinforcing member made from a compressed metal wire are integrally formed in mixed form, if the reinforcing member is contained at a rate of more than 80 wt. %, and the heat-resistant material is contained at a rate of less than 20 wt. %, sealing (filling) by the heat-resistant material with respect to a multiplicity of infinitesimal passages (gaps) occurring around the reinforcing member fails to be effected completely in many cases. Consequently, initial leakage of exhaust gases can result. Even if the sealing with respect to the infinitesimal passages has been completely effected throughout, such sealing disappears at an early period due to such as the oxidation and wear of the heat-resistant material at high temperatures, and the leakage of exhaust gases occurs at an early period. On the other hand, if the reinforcing member is contained at a rate of less than 15 wt. %, and the heat-resistant material is contained at a rate of more than 85 wt. %, the amount of reinforcing member becomes extremely small at the annular sliding surface and in the vicinities of the annular sliding surface. Consequently, reinforcement for the heat-resistant material at the annular sliding surface and in the vicinities of the annular sliding surface fails to be effected satisfactorily. Hence, the exfoliation of the heat-resistant material occurs noticeably, and it becomes difficult to expect a reinforcement effect derived from the reinforcing member.

In addition, in the above-described seal body, if the seal body is not strongly compressed at the manufacturing stage, and the heat-resistant material has a density smaller than 1.20 g/cm$^3$, infinitesimal cavities occur and spread extensively in such a heat-resistant material over long periods of use. As a result, the leakage of exhaust gases occurs. On the other hand, if the seal body is compressed very strongly at the manufacturing stage, and the heat-resistant material has a density greater than 2.00 g/cm$^3$, appropriate transfer of the heat-resistant material to a mating member practically does not take place, so that the difference between the coefficient of dynamic friction and the coefficient of static friction becomes extremely large. Consequently, abnormal noise is likely to occur during sliding.

From the above-described perspective, the spherical annular seal member according to the first aspect is free of leakage of exhaust gases through the seal body itself, does not generate abnormal noise during sliding with the mating member, and has a stable sealing characteristic.

A spherical annular seal member according to a second aspect of the invention comprises: a seal body which has an annular sliding surface and in which at least a heat-resistant material and a reinforcing member made of a metal wire have been compressed to fill meshes of the metal wire net of the reinforcing member with the heat-resistant material such that the heat-resistant material and the reinforcing member are integrally formed in mixed form; and a covering layer formed integrally with an outer peripheral surface of the seal body and formed of at least a lubricating material, the annular sliding surface being formed by an exposed surface of the covering layer, wherein, in the seal body and the covering layer, the reinforcing member is contained at a rate of 15 to 80 wt. %, and the heat-resistant material and the lubricating material are contained at a rate of 20 to 85 wt. %, and wherein the heat-resistant material and the lubricating material in the seal body and the covering layer have a density of 1.20 g/cm³ to 2.00 g/cm³.

Since the spherical annular seal member according to the second aspect has an annular sliding surface formed by an exposed surface of the covering layer, it is possible to ensure smoother sliding on the mating member abutting against such an annular sliding surface. Moreover, in the same way as the spherical annular seal member according to the first aspect, the leakage of exhaust gases through the seal body itself does not occur, and abnormal noise does not occur during sliding on the mating member.

A spherical annular seal member according to a third aspect of the invention comprises: a seal body which has an annular sliding surface and in which at least a heat-resistant material and a reinforcing member made of a metal wire have been compressed to fill meshes of the metal wire net of the reinforcing member with the heat-resistant material such that the heat-resistant material and the reinforcing member are integrally formed in mixed form; and a covering layer formed integrally with an outer peripheral surface of the seal body and formed such that at least a heat-resistant material and a reinforcing member made of a metal wire have been compressed to fill meshes of the metal wire net of the reinforcing member with the lubricating material and the heat-resistant material such that the lubricating material, the heat-resistant material, and the reinforcing member are integrally formed in mixed form, the annular sliding surface being formed by an exposed surface of the covering layer in which a surface constituted by the reinforcing member and a surface constituted by the lubricating material are present in mixed form, wherein, in the seal body and the covering layer, the reinforcing member is contained at a rate of 15 to 80 wt. %, and the heat-resistant material and the lubricating material are contained at a rate of 20 to 85 wt. %, and wherein the heat-resistant material and the lubricating material in the seal body and the covering layer have a density of 1.20 g/cm³ to 2.00 g/cm³.

Since the spherical annular seal member according to the third aspect has an annular sliding surface formed by an exposed surface of the covering layer in which a surface constituted by the reinforcing member and a surface constituted by the lubricating material are present in mixed form, in the same way as the spherical annular seal member according to the second aspect, it is possible to ensure smoother sliding on the mating member abutting against the annular sliding surface. Moreover, the surface constituted by the lubricating material at the exposed surface can be held by the surface constituted by the reinforcing member. In addition, the transfer of the lubricating material from the annular sliding surface to the mating member and the scraping of the lubricating material transferred to the mating member can be effected appropriately, with the result that it is possible to ensure smooth sliding over long periods of time. Furthermore, in the same way as the spherical annular seal member according to the first aspect, the leakage of exhaust gases through the seal body itself does not occur, and abnormal noise does not occur during sliding on the mating member.

A spherical annular seal member according to a fourth aspect of the invention comprises: a seal body which has an annular sliding surface and in which at least a heat-resistant material and a reinforcing member made of a metal wire have been compressed to fill meshes of the metal wire net of the reinforcing member with the heat-resistant material such that the heat-resistant material and the reinforcing member are integrally formed in mixed form; and a covering layer formed integrally with an outer peripheral surface of the seal body and formed such that at least a lubricating material, a heat-resistant material and a reinforcing member made of a metal wire have been compressed to fill meshes of the metal wire net of the reinforcing member with the lubricating material and the heat-resistant material such that the lubricating material, the heat-resistant material, and the reinforcing member are integrally formed in mixed form, the annular sliding surface being formed by an exposed surface of the covering layer in which a surface constituted by the reinforcing member and a surface constituted by the lubricating material are present in mixed form, wherein, in an annular surface layer portion of the spherical annular seal member with a thickness of 1 mm from the annular sliding surface, the reinforcing member is contained at a rate of 60 to 75 wt. %, the heat-resistant material and the lubricating material are contained at a rate of 25 to 40 wt. %, and the reinforcing member, the heat-resistant material, and the lubricating material in the annular surface layer portion have a density of 3.00 g/cm³ to 5.00 g/cm³, and wherein, in a remaining annular portion of the spherical annular seal member excluding the annular surface layer portion, the reinforcing member is contained at a rate of 20 to 70 wt. %, and the heat-resistant material is contained at a rate of 30 to 80 wt. %.

In the spherical annular seal member, the thickness of the covering layer in which the lubricating material, the heat-resistant material, and the reinforcing member are integrally formed in mixed form is experientially sufficient if it is 1 mm or less from the standpoint of its service life attributable to wear. Accordingly, if the reinforcing member is contained at a rate of less than 60 wt. % in the annular surface layer portion of the spherical annular seal member with a thickness of 1 mm from the annular sliding surface, and the heat-resistant material and the lubricating material are contained therein at a rate of more than 40 wt. %, it becomes difficult to sufficiently obtain the effect of the reinforcing member at that surface layer portion. Consequently, the exfoliation and coming off at that surface layer portion are likely to occur. On the other hand, if the reinforcing member is contained at a rate of more than 75 wt. %, and the heat-resistant material and the lubricating material are contained at a rate of less than 25 wt. %, sealing (filling) by the heat-resistant material with respect to the multiplicity of infinitesimal passages (gaps) occurring around the reinforcing member fails to be effected completely. Consequently, initial leakage of exhaust gases through the surface layer portion can result. Even if the sealing with respect to the infinitesimal passages has been completely effected throughout, such sealing disappears at an early period due to such as the oxidation and wear of the heat-resistant material at high temperatures, and the leakage of exhaust gases occurs at an early period.

In addition, if the reinforcing member, the heat-resistant material, and the lubricating material in the annular surface layer portion have a density smaller than 3.00 g/cm³, it means that the seal body has not been strongly compressed at the manufacturing stage. As such, infinitesimal cavities occur and spread extensively in such an annular surface layer portion over long periods of use. As a result, the leakage of exhaust gases occurs. On the other hand, if the reinforcing member, the heat-resistant material, and the lubricating material have a density greater than 5.00 g/cm³, it means that the seal body has been compressed very strongly at the manufacturing stage. As such, appropriate transfer of the heat-resistant material to a mating member practically does not take place, so that the difference between the coefficient of dynamic friction and the coefficient of static friction becomes extremely large. Consequently, abnormal noise is likely to occur during sliding.

Furthermore, if the reinforcing member is contained at a rate of less than 20 wt. %.in the remaining annular portion of the spherical annular seal member excluding the annular surface layer portion, and the heat-resistant material is contained therein at a rate of more than 80 wt. %, reinforcement for the heat-resistant material at the remaining annular portion fails to be effected satisfactorily. Hence, the exfoliation of the heat-resistant material occurs noticeably, and it becomes difficult to expect the reinforcement effect derived from the reinforcing member. On the other hand, if the reinforcing member is contained at a rate of more than 70 wt. %, and the heat-resistant material is contained at a rate of less than 30 wt. %, sealing (filling) by the heat-resistant material with respect to a multiplicity of infinitesimal passages (gaps) occurring around the reinforcing member fails to be effected completely in many cases. Consequently, initial leakage of exhaust gases can result. Even if the sealing with respect to the infinitesimal passages has been completely effected throughout, such sealing disappears at an early period due to such as the oxidation and wear of the heat-resistant material at high temperatures, and the leakage of exhaust gases occurs at an early period.

Hence, in accordance with the spherical annular seal member according to the fourth aspect, in the annular surface layer portion, the reinforcing member is contained at a rate of 60 to 75 wt. %, the heat-resistant material and the lubricating material are contained at a rate of 25 to 40 wt. %, and the reinforcing member, the heat-resistant material, and the lubricating material in the annular surface layer portion have a density of 3.00 g/cm$^3$ to 5.00 g/cm$^3$. Therefore, the exfoliation and coming off of the surface layer portion are difficult to occur, and initial leakage of exhaust gases through the surface layer portion does not occur. Moreover, the leakage of exhaust gases can be prevented not only in an early period but in a longer period, and the occurrence of abnormal noise can be prevented during sliding on the mating member.

In addition, in accordance with the spherical annular seal member according to the fourth aspect, in a remaining annular portion of the spherical annular seal member excluding the annular surface layer portion, the reinforcing member is contained at a rate of 20 to 70 wt. %, and the heat-resistant material is contained at a rate of 30 to 80 wt. %. Therefore, the leakage of exhaust gases through the remaining annular portion can be prevented reliably, and reinforcement of the heat-resistant material in this portion is rendered satisfactory, satisfactorily preventing the exfoliation of the heat-resistant material.

A spherical annular seal member according to a fifth aspect of the invention comprises: a seal body which has an annular sliding surface and in which at least a heat-resistant material and a reinforcing member made of a metal wire have been compressed to fill meshes of the metal wire net of the reinforcing member with the heat-resistant material such that the heat-resistant material and the reinforcing member are integrally formed in mixed form; and a covering layer formed integrally with an outer peripheral surface of the seal body and formed such that at least a lubricating material, a heat-resistant material and a reinforcing member made of a metal wire have been compressed to fill meshes of the metal wire net of the reinforcing member with the lubricating material and the heat-resistant material such that the lubricating material, the heat-resistant material, and the reinforcing member are integrally formed in mixed form, the annular sliding surface being formed by an exposed surface of the covering layer in which a surface constituted by the reinforcing member and a surface constituted by the lubricating material are present in mixed form, wherein, in the covering layer, the reinforcing member is contained at a rate of 60 to 75 wt. %, and the heat-resistant material and the lubricating material are contained at a rate of 25 to 40 wt. %.

In accordance with the spherical annular seal member according to the fifth aspect, in the same way as the spherical annular seal member according to the fourth aspect, the reinforcing member is contained in the covering layer at a rate of 60 to 75 wt. %, and the heat-resistant material and the lubricating material are contained therein at a rate of 25 to 40 wt. %. Therefore, the exfoliation and coming off of the covering layer are difficult to occur, and initial and early leakage of exhaust gases through the covering layer can be prevented reliably.

A spherical annular seal member according to a fifth aspect of the invention comprises: a seal body which has an annular sliding surface and in which at least a heat-resistant material and a reinforcing member made of a metal wire have been compressed to fill meshes of the metal wire net of the reinforcing member with the heat-resistant material such that the heat-resistant material and the reinforcing member are integrally formed in mixed form; and a covering layer formed integrally with an outer peripheral surface of the seal body and formed such that at least a lubricating material, a heat-resistant material and a reinforcing member made of a metal wire have been compressed to fill meshes of the metal wire net of the reinforcing member with the lubricating material and the heat-resistant material such that the lubricating material, the heat-resistant material, and the reinforcing member are integrally formed in mixed form, the annular sliding surface being formed by an exposed surface of the covering layer in which a surface constituted by the reinforcing member and a surface constituted by the lubricating material are present in mixed form, wherein, in the annular sliding surface, the surface constituted by the reinforcing member is exposed at an area rate of 0.5 to 30%, and the surface constituted by the lubricating material is exposed at an area rate of 70 to 99.5%.

If, in the annular sliding surface, the surface constituted by the reinforcing member is exposed at an area rate of less than 0.5%, and the surface constituted by the lubricating material is exposed at an area rate of more than 99.5%, the annular sliding surface is substantially occupied by the surface constituted by the lubricating material, so that the exfoliation and coming off of the surface constituted by the lubricating material are likely to occur. Further, despite the fact that the transfer of the lubricating material from the annular sliding surface to the mating member takes place more than necessary, the scraping of the lubricating material transferred to the mating member is not effected as much. On the other hand, if the surface constituted by the reinforcing member is exposed at an area rate of more than 30%, and the surface constituted by the lubricating material is exposed at an area rate of less than 70%, the effect derived from the lubricating material becomes small. Hence, the wear of the mating member which slidably abuts against the annular sliding surface and relatively slides becomes noticeable, and it becomes impossible to obtain smooth sliding over long periods of use.

Therefore, in accordance with the spherical annular seal member according to the sixth embodiment, it is possible to prevent the exfoliation and coming off of the surface constituted by the lubricating material at the annular sliding surface. Moreover, it is possible to obtain smooth sliding on the mating member over long periods of use, and eliminate the occurrence of abnormal noise.

Although, in the spherical annular seal member according to the above-described various aspects, the heat-resistant material preferably contains expanded graphite as in the spherical annular seal member according to a seventh aspect of the invention, the invention is not limited to the same. For instance, in addition to or in substitution of expanded graphite, the heat-resistant material may contain those which are selected from one or two or more kinds of mica and asbestos. In addition, in the spherical annular seal member according to the above-described various aspects, the annular sliding surface preferably includes a partially convex spherical surface, a partially concave spherical surface, or a truncated conical surface as in the spherical annular seal member in accordance with an eighth aspect of the invention. The spherical annular seal member at such a partially convex spherical surface, partially concave spherical surface, or truncated conical surface is adapted to slidably abut against the mating member. Furthermore, in the above-described various aspects, the spherical annular seal member may comprise an outer peripheral surface including the annular sliding surface as in the spherical annular seal member according to a ninth aspect of the invention, may comprise an inner peripheral surface including the annular sliding surface as in the spherical annular seal member according to a 10th aspect of the invention.

It should be noted that the annular sliding surface of the spherical annular seal member may be adapted to slidably abut against the mating member wholly, or may be alternatively adapted to slidably abut against the mating member partially in belt form. Furthermore, the annular sliding surface is not limited to the one which includes one partially convex spherical surface, one partially concave spherical surface, or one truncated conical surface, but may include two or more partially convex spherical surfaces or partially concave spherical surfaces having different positions of the center of curvature or radii of curvature, or truncated conical surfaces having different degrees of inclination.

A method of the invention for manufacturing the spherical annular seal member according to any one of the above-described aspects comprises the steps of: preparing a heat-resistant sheet member containing the heat-resistant material and a reinforcing sheet member made from the metal wire net; forming a tubular base member by superposing the reinforcing member on the heat-resistant sheet member and by subsequently convoluting a superposed assembly thereof into a cylindrical form; and fitting the tubular base member over an outer peripheral surface of a core of a die, and compression-forming the tubular base member in the die in an axial direction of the core.

In addition, a method of the invention for manufacturing the spherical annular seal member according to any one of the above-described first to ninth aspects comprises the steps of: forming a tubular base member by superposing a reinforcing sheet member containing the heat-resistant material on a heat-resistant sheet member made from the metal wire net and by subsequently convoluting a superposed assembly thereof into a cylindrical form; forming a cylindrical preform by winding a covering-layer forming member, which is constituted by another heat-resistant sheet member containing the heat-resistant material, a lubricating layer containing the lubricating material and coated on one surface of the other heat-resistant sheet member, and another reinforcing sheet member disposed in the lubricating layer and made from the metal wire net, around an outer peripheral surface of the tubular base member with a surface of the lubricating layer placed on an outer side; and fitting the cylindrical preform over an outer peripheral surface of a core of a die, and compression-forming the cylindrical preform in the die in an axial direction of the core.

Further, a method of the invention for manufacturing the spherical annular seal member according to any one of the above-described first to eighth and tenth aspects comprises the steps of: forming a tubular base member by convoluting a covering-layer forming member, which is constituted by a heat-resistant sheet member, a lubricating layer containing the lubricating material and coated on one surface of the heat-resistant sheet member, and a reinforcing sheet member disposed in the lubricating layer and made from the metal wire net, with a surface of the lubricating layer placed on an inner side; forming a cylindrical preform by superposing another reinforcing sheet member made from the metal wire net on another heat-resistant sheet member containing the heat-resistant material and by subsequently winding a superposed assembly thereof around an outer peripheral surface of the tubular base member; and fitting the cylindrical preform over an outer peripheral surface of a core of a die, and compression-forming the cylindrical preform in the die in an axial direction of the core.

According to the invention, it is possible to provide a spherical annular seal member which makes it possible to eliminate the leakage of exhaust gases through the spherical annular seal member itself, and which makes it possible to eliminate the occurrence of abnormal noise, as well as a method of manufacturing the same.

Hereafter, a description will be given of the present invention and a mode for carrying it out on the basis of preferred embodiments illustrated in the drawings. It should be noted that the invention is not limited to these embodiments.

EMBODIMENTS

Figure 1:
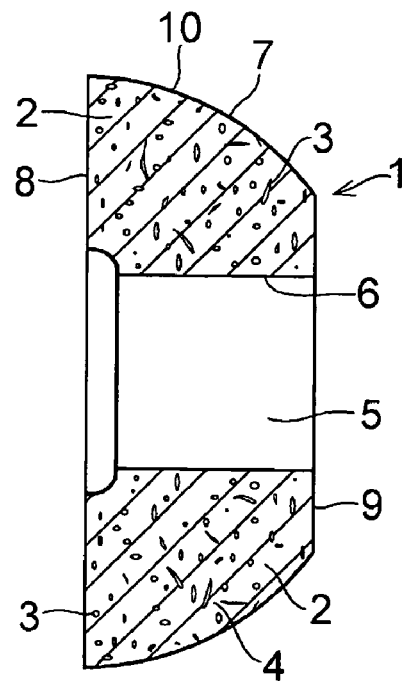
FIG. 1 is a vertical cross sectional view illustrating an embodiment of a spherical annular seal member in accordance with the present invention.

In FIG. 1, a spherical annular seal member 1 has a seal body 4 in which a heat-resistant material 2 and a reinforcing member 3 made of a metal wire have been compressed to fill meshes of the metal wire net of the reinforcing member 3 with the heat-resistant material 2 such that the heat-resistant material 2 and the reinforcing member 3 are integrally formed in mixed form. In this embodiment, the seal body 4 itself has a cylindrical inner peripheral surface 6 defining a through hole 5; an outer peripheral surface 10 including a partially convex spherical surface 7 serving as an annular sliding surface, i.e., in this embodiment the outer peripheral surface 10 constituted by only the partially convex spherical surface 7; and annular end faces 8 and 9 respectively provided on a large-diameter side and a small-diameter side of the partially convex spherical surface 7. In such a seal body 4, the reinforcing member 3 and the heat-resistant material 2 are respectively contained at a rate of 15 to 80 wt. % and at a rate of 20 to 85 wt. %. The heat-resistant material 2 in the seal body 4 has a density of 1.20 g/cm$^3$ to 2.00 g/cm$^3$.

The heat-resistant material 2 containing expanded graphite is formed by pressurizing and compressing an expanded graphite sheet serving as a heat-resistant sheet member and obtained by compacting expanded graphite particles. The heat-resistant material 2 may contain such as phosphorus pentoxide, phosphate, and other oxidation inhibitors or the like, as required.

The reinforcing member 3 is formed by pressurizing and compressing a metal wire net whose meshes are 3 to 6 mm or thereabouts and which is formed by weaving or knitting by using one or more fine wire members having a diameter of 0.10 to 0.32 mm or thereabouts. The fine wires include, as an iron-based wire, a stainless steel wire made of such as austenitic stainless steels SUS 304 or SUS 316, a ferritic stainless steel SUS 430, or an iron wire (JIS-G-3532) or a galvanized iron wire (JIS-G-3547), or, as a copper wire, a wire member made of a copper-nickel alloy (cupro-nickel), a copper-nickel-zinc alloy (nickel silver), brass, or beryllium copper.

As the reinforcing member 3, in addition to the above-described metal wire net, it is also possible to use as the metal wire net a so-called expanded metal in which a stainless steel sheet or a phosphor bronze sheet with a thickness of 0.3 to 0.5 mm or thereabouts is slotted and the slots are expanded to form rows of regular meshes of 3 to 6 mm.

Figure 2:
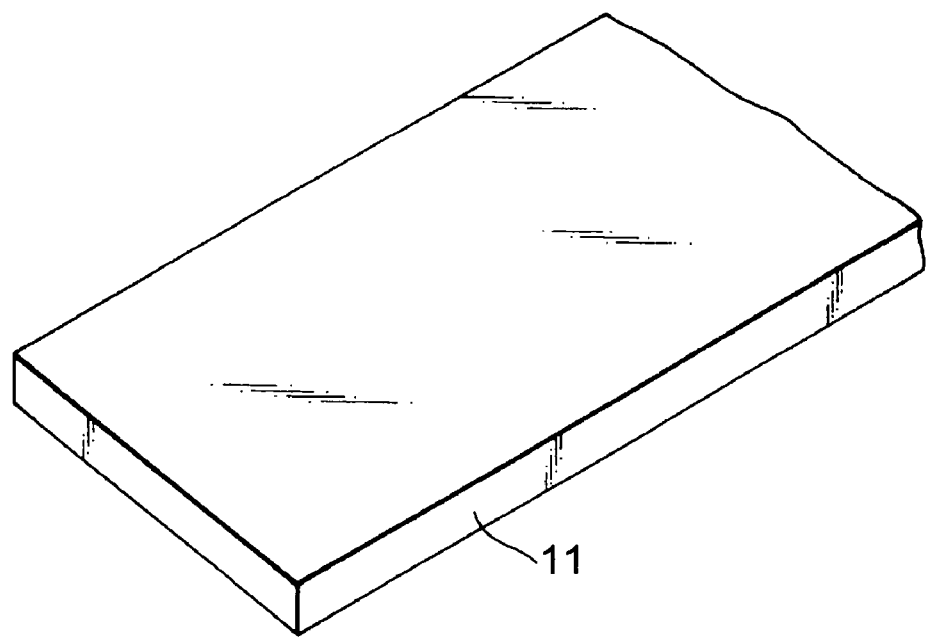
FIG. 2 is a perspective view of a heat-resistant sheet member in a manufacturing process of the embodiment shown in FIG. 1.
Figure 3:
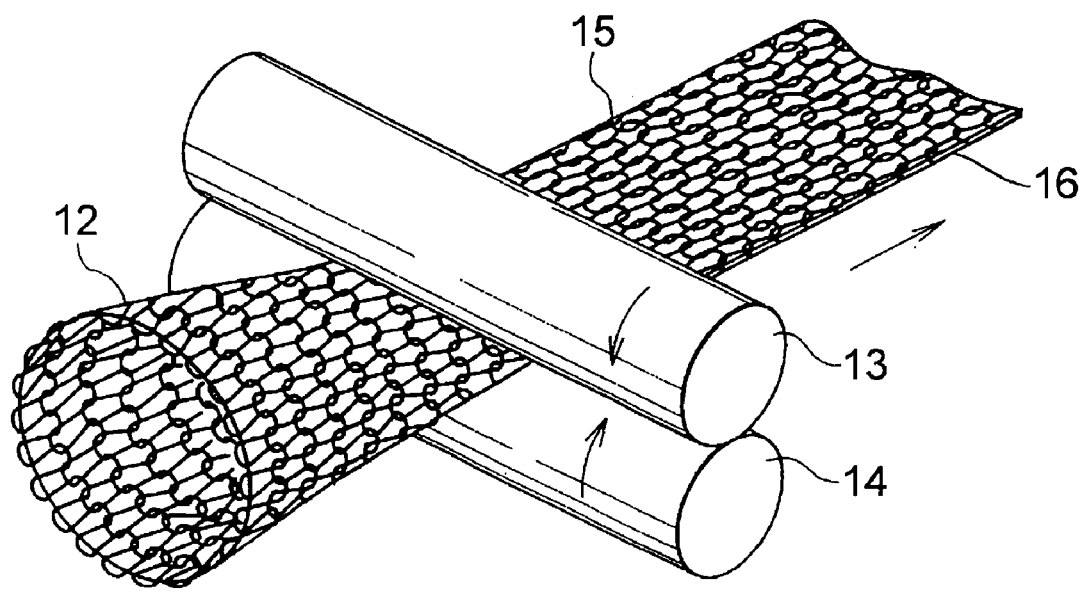
FIG. 3 is a diagram explaining a method of forming a reinforcing sheet member made from a metal wire net in the manufacturing process of the embodiment shown in FIG. 1.
Figure 4:
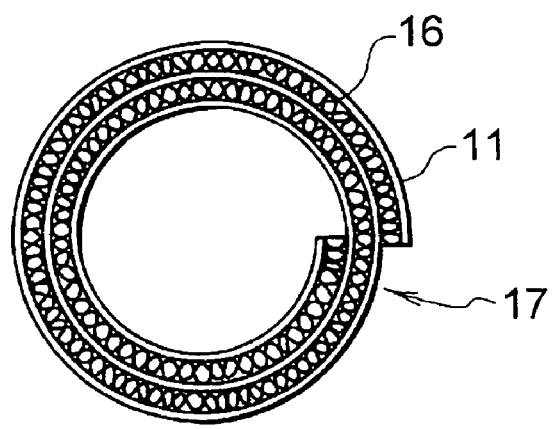
FIG. 4 is a plan view of a tubular base member in the manufacturing process of the embodiment shown in FIG. 1.
Figure 5:
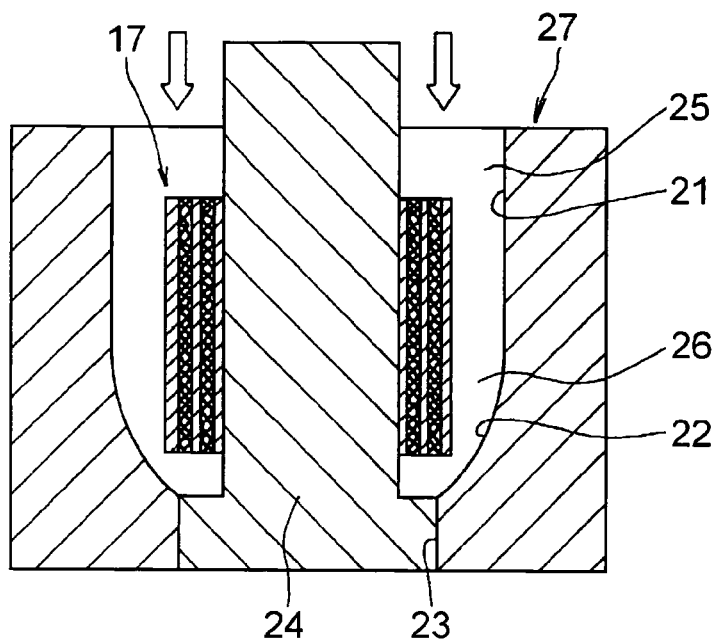
FIG. 5 is a vertical cross-sectional view illustrating a state in which the tubular base member is inserted in a die in the manufacturing process of the embodiment shown in FIG. 1.

Next, a description will be given of a method of manufacturing the spherical annular seal member 1 shown in FIG. 1. First, a strip-like heat-resistant sheet member 11 and a reinforcing sheet member 16 are prepared. The heat-resistant sheet member 11 is composed of expanded graphite as the heat-resistant material 2 and cut to a predetermined width and length, such as the one shown in FIG. 2. The reinforcing sheet member 16 is formed such that a metal wire net formed by weaving or knitting fine metal wires is cut into a predetermined width (substantially identical to the width of the heat-resistant sheet member) and a predetermined length. Alternatively, as shown in FIG. 3, after a cylindrical metal wire net 12 is formed by knitting fine metal wires, this cylindrical metal wire net 12 is passed between a pair of rollers 13 and 14 so as to fabricate a belt-shaped metal wire net 15 of a predetermined width (substantially identical to the width of the heat-resistant sheet member), and this belt-shaped metal wire net 15 is cut to a predetermined length. Next, the heat-resistant sheet member 11 and the reinforcing sheet member 16 are superposed one on top of the other, and this superposed assembly is convoluted with the heat-resistant sheet member 11 placed on the inner side such that heat-resistant sheet member 11 is convoluted with one more turn, thereby forming a tubular base member 17, as shown in FIG. 4. Further, a die 27 such as the one shown in FIG. 5 is prepared. The die 27 has a cylindrical inner wall surface 21, a partially concave spherical inner wall surface 22 continuing from the cylindrical inner wall surface 21, and a through hole 23 continuing from the partially concave spherical inner wall surface 22. As a stepped core 24 is inserted in the through hole 23, a hollow cylindrical portion 25 and a spherical annular hollow portion 26 continuing from the hollow cylindrical portion 25 are formed inside the die 27. Then, the tubular base member 17 is fitted over the stepped core 24 of the die 27. The tubular base member 17 located in the hollow cylindrical portion 25 and the spherical annular hollow portion 26 of the die 27 is subjected to compression forming with a predetermined pressure in the direction of the core axis, thereby forming the spherical annular seal member 1 made up of the seal body 4 having the partially convex spherical surface 7, as shown in FIG. 1.

Then, by appropriately selecting the thickness of the heat-resistant sheet member 11 used as the heat-resistant material 2, the kind, wire diameter, and the degree of mesh of the wire of the metal wire net used as the reinforcing member 3, the degree of pressure with respect to the tubular base member 17, and the like, it is possible to obtain the spherical annular seal member 1 made up of the seal body 4 in which the reinforcing member 3 and the heat-resistant material 2 are respectively contained at a rate of 15 to 80 wt. % and at a rate of 20 to 85 wt. %. The heat-resistant material 2 in the seal body 4 has a density of 1.20 g/cm$^3$ to 2.00 g/cm$^3$.

Figure 6:
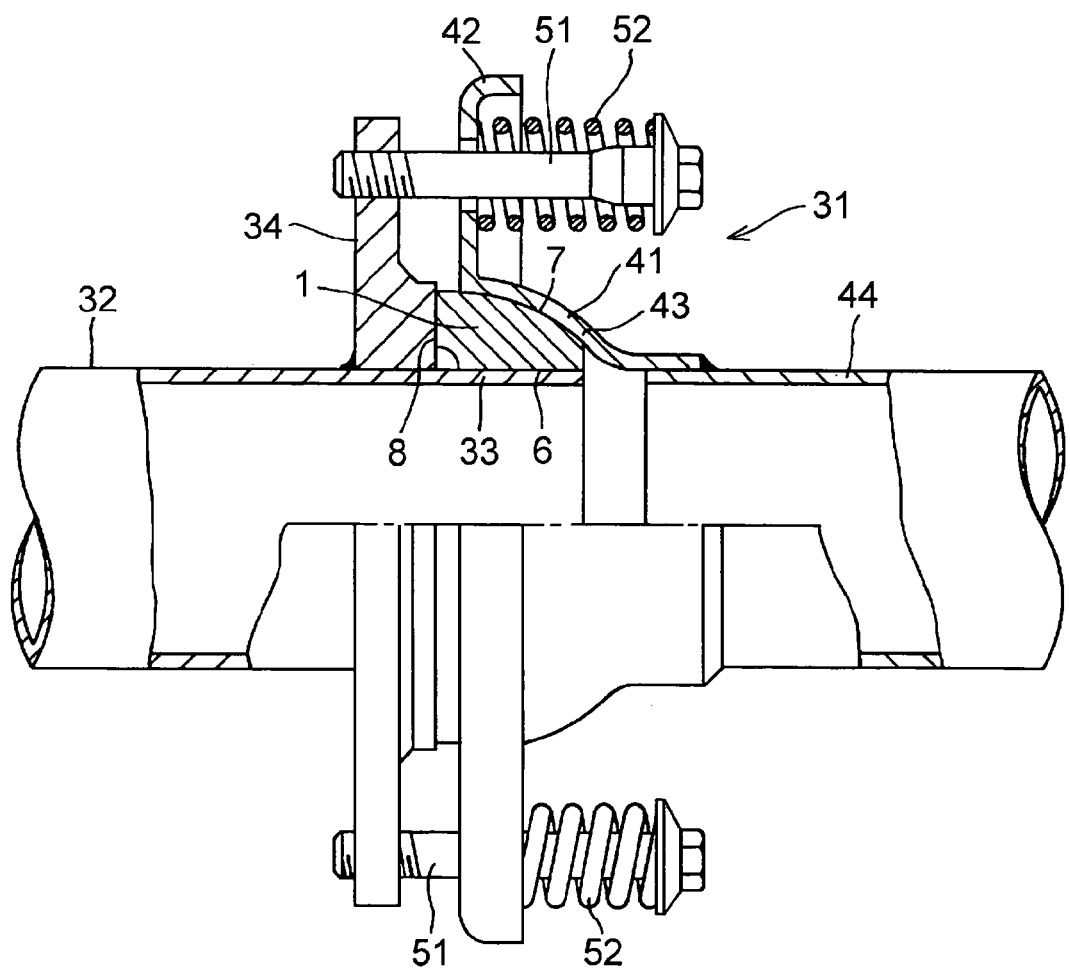
FIG. 6 is a vertical cross-sectional view of an exhaust pipe spherical joint in which the spherical annular seal member in accordance with the embodiment shown in FIG. 1 has been incorporated.

The spherical annular seal member 1 is used by being incorporated in an exhaust pipe spherical joint 31 shown in FIG. 6, for example. That is, a flange 34 is secured by such as welding to an outer peripheral surface of an upstream-side exhaust pipe 32, which is connected to an engine, by leaving a pipe end 33. The spherical annular seal member 1 is fitted over the pipe end 33 at the inner peripheral surface 6 defining the through hole 5, and is seated with its large-diameter-side end face 8 abutting against that flange 34. A downstream-side exhaust pipe 44 opposes the upstream-side exhaust pipe 32 and is connected to a muffler. A flared portion 43, which serves as a mating member and is comprised of a concave spherical surface portion 41 and a flange portion 42 provided at a rim of an opening portion of the concave spherical surface portion 41, is formed integrally on the downstream-side exhaust pipe 44. The downstream-side exhaust pipe 44 is disposed with the concave spherical surface portion 41 slidably abutting against the partially convex spherical surface 7 of the spherical annular seal member 1.

In the exhaust pipe spherical joint 31 shown in FIG. 6, the downstream-side exhaust pipe 44 is constantly urged resiliently toward the upstream-side exhaust pipe 32 by means of a pair of bolts 51 each having one end fixed to the flange 34 and another end arranged by being inserted in the flange portion 42 of the flared portion 43, and by means of a pair of coil springs 52 each arranged between an enlarged head of the bolt 51 and the flange portion 42. The exhaust pipe spherical joint 31 is arranged such that relative angular displacements occurring in the upstream- and downstream-side exhaust pipes 32 and 44 are allowed by sliding between the partially convex spherical surface 7 of the spherical annular seal member 1 and the concave spherical surface portion 41 of the flared portion 43 formed at the end of the downstream-side exhaust pipe 44.

The spherical annular seal member 1 which is applied to such an exhaust pipe spherical joint 31 is made up of the seal body 4 in which the reinforcing member 3 and the heat-resistant material 2 are respectively contained at a rate of 15 to 80 wt. % and at a rate of 20 to 85 wt. %, and the heat-resistant material 2 has a density of 1.20 g/cm$^3$ to 2.00 g/cm$^3$. Therefore, the leakage of exhaust gases through the seal body 4 itself does not occur, and abnormal noise does not occur during sliding on the concave spherical surface portion 41 which is the mating member.

Figure 7:
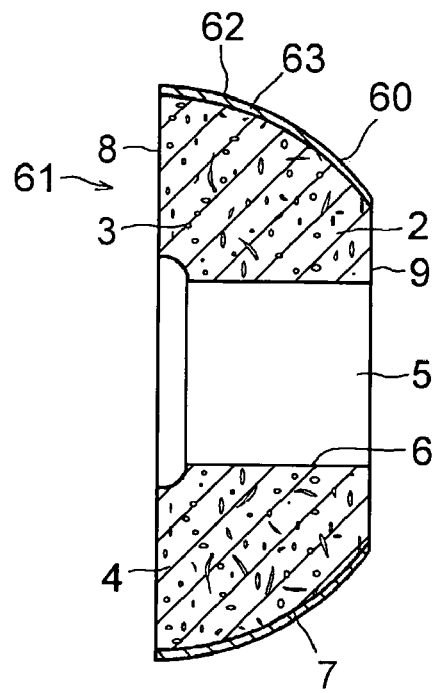
FIG. 7 is a vertical cross-sectional view illustrating another embodiment of the spherical annular seal member in accordance with the invention.

Although the spherical annular seal member 1, in the above description, is formed by the seal body 4, the spherical annular seal member 1 may be formed by the seal body and a covering layer, as shown in FIG. 7. Namely, a spherical annular seal member 61 shown in FIG. 7 has an outer peripheral surface 60 including a partially convex spherical surface 62 serving as an annular sliding surface, i.e., in this embodiment the outer peripheral surface 60 constituted by only the partially convex spherical surface 62. The spherical annular seal member 61 further has the aforementioned seal body 4 and a covering layer 63 formed of a lubricating material and formed integrally with the outer peripheral surface 7 (the aforementioned partially convex spherical surface 7) of the seal body 4, the partially convex spherical surface 62 being formed by the exposed surface of the covering layer 63.

As for the covering layer 63, the lubricating material is applied to the outer peripheral surface 7 of the seal body 4 formed in the same way as described above, by brushing, immersion, spraying, or the like to assume a thickness of 10 to 300 μm or thereabouts. After the lubricating material thus applied is dried, the exposed surface is smoothed, and the covering layer 63 is formed by the partially convex spherical surface 62 constituted by such a smooth exposed surface.

The lubricating material as a material for forming the covering layer 63 is polytetrafluoroethylene resin, a material whose principal component is polytetrafluoroethylene resin and which contains boron nitride, as required, or the like, and the covering layer 64 is formed by applying an aqueous dispersion thereof.

The spherical annular seal member 61 shown in FIG. 7 has on the outer peripheral surface 7 of the seal body 4 the covering layer 63 constituted by the lubricating material, and has the partially convex spherical surface 62 formed by the exposed surface of the covering layer 63. Therefore, in the application to the exhaust pipe spherical joint, it is possible to ensure smoother sliding on the mating member abutting against such a partially convex spherical surface 62. Moreover, in the same way as the spherical annular seal member 1, the leakage of exhaust gases through the seal body 4 itself does not occur, and abnormal noise does not occur during sliding on the concave spherical surface portion 41 which is the mating member.

Figure 8:
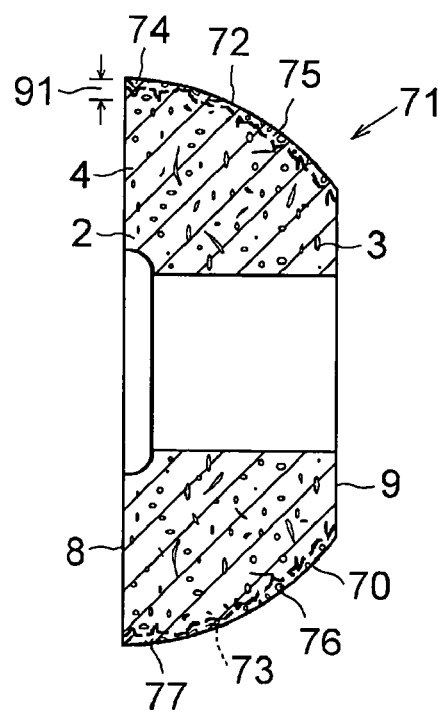
FIG. 8 is a vertical cross-sectional view illustrating still another embodiment of the spherical annular seal member in accordance with the invention.
Figure 9:
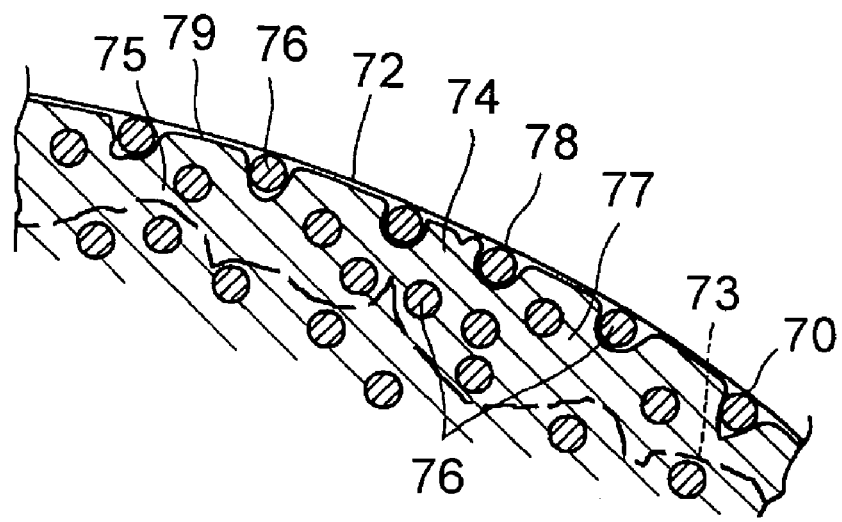
FIG. 9 is a partially enlarged cross-sectional view of the embodiment shown in FIG. 8.

The spherical annular seal member in accordance with the invention may be a spherical annular seal member 71 such as the one shown in FIGS. 8 and 9, instead of the spherical annular seal members 1 and 61 shown in FIGS. 1 and 7. The spherical annular seal member 71 shown in FIGS. 8 and 9 has an outer peripheral surface 70 including a partially convex spherical surface 72 serving as the annular sliding surface, i.e., in this embodiment the outer peripheral surface 70 constituted by only the partially convex spherical surface 72. The spherical annular seal member 71 further has the seal body 4 as well as a covering layer 77 which is formed integrally with an outer peripheral surface 73 (corresponding to the aforementioned partially convex spherical surface 7 but having an irregular surface) of the seal body 4, and in which a lubricating material 74, a heat-resistant material 75, and a reinforcing member 76 made from a metal wire net have been compressed to fill the meshes of the metal wire net of the reinforcing member 76 with the lubricating material 74 and the heat-resistant material 75, such that the lubricating material 74, the heat-resistant material 75, and the reinforcing member 76 are integrated in mixed form. The partially convex spherical surface 72 is formed by the exposed surface of the covering layer 77 in which a surface 78 constituted by the reinforcing member 76 and a surface 79 constituted by the lubricating material 74 are present in mixed form. In the seal body 4 and the covering layer 77, the reinforcing members 3 and 76 are contained at a rate of 15 to 80 wt. %, and the heat-resistant materials 2 and 75 and the lubricating material 74 are contained at a rate of 20 to 85 wt. %. The heat-resistant materials 2 and 75 and the lubricating material 74 in the seal body 4 and the covering layer 77 have a density of 1.20 g/cm$^3$ to 2.00 g/cm$^3$.

Figure 10:
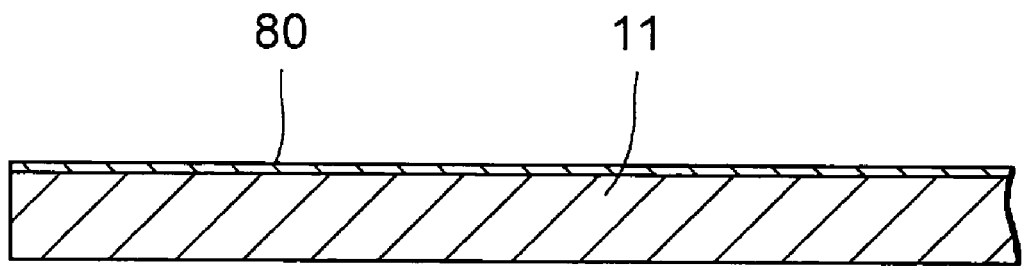
FIG. 10 is a vertical cross-sectional view of the heat-resistant sheet member in which a lubricating layer has been formed in the manufacturing process of the embodiment shown in FIG. 8.
Figure 11:
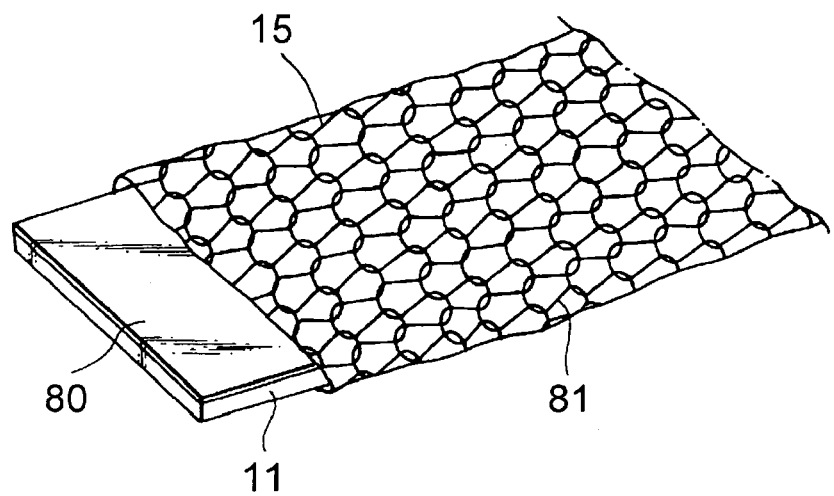
FIG. 11 is a diagram explaining the method of forming a covering-layer forming member in the manufacturing process of the embodiment shown in FIG. 8.
Figure 12:
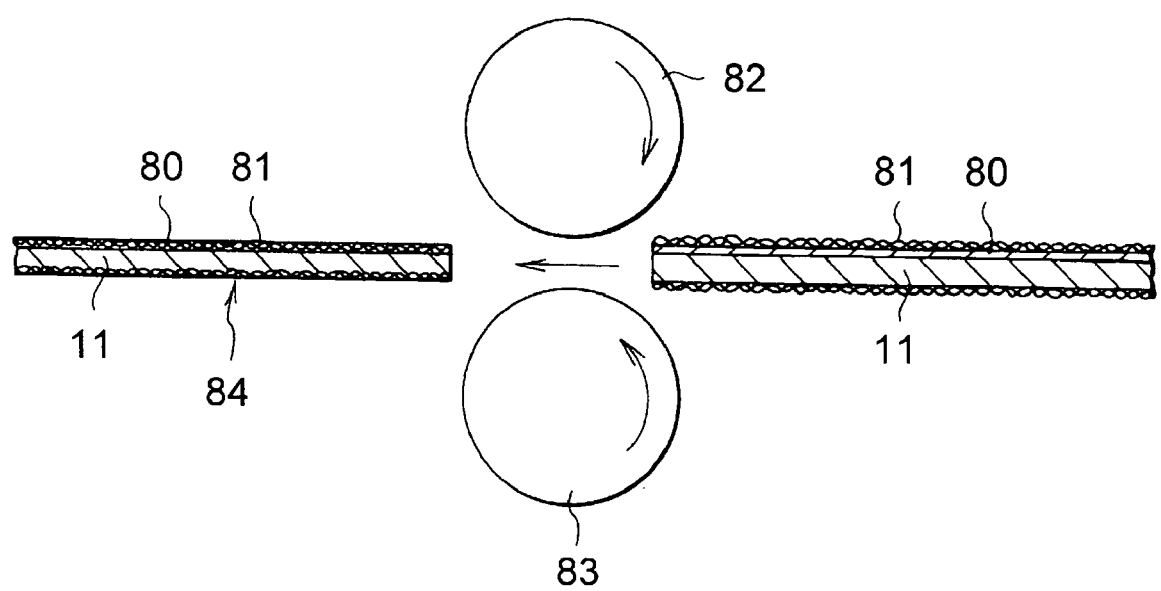
FIG. 12 is a diagram explaining the method of forming the covering-layer forming member in the manufacturing process of the embodiment shown in FIG. 8.
Figure 13:
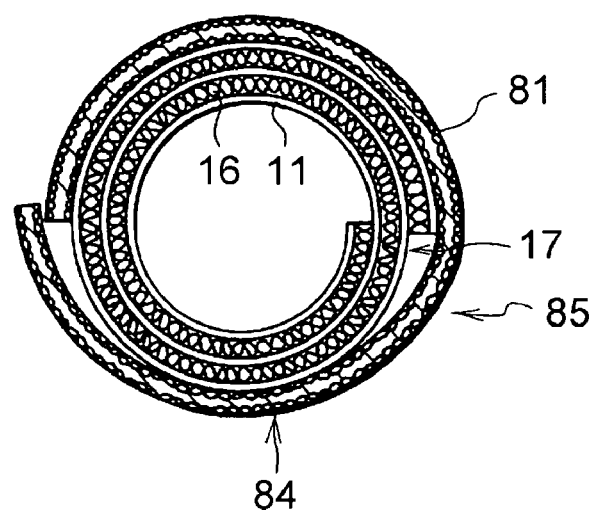
FIG. 13 is a plan view explaining the method of forming a cylindrical preform in the manufacturing process of the embodiment shown in FIG. 8.

Next, a description will be given of the method of manufacturing the spherical annular seal member 71 shown in FIGS. 8 and 9. First, the tubular base member 17 such as the one shown in FIG. 4 is prepared in the same way as the spherical annular seal member 1. Next, the heat-resistant sheet member 11 such as the one shown in FIG. 2 is prepared separately. An aqueous dispersion containing polytetrafluoroethylene resin as the lubricating material is coated on one surface of this other heat-resistant sheet member 11 by means of brushing, roller coating, spraying, or the like. This coating is then dried to form a lubricating layer 80 such as the one shown in FIG. 10. Further, a reinforcing sheet member 81 made from the belt-shaped metal wire net 15 such as the one shown in FIG. 3 is prepared separately. Subsequently, as shown in FIG. 11, the heat-resistant sheet member 11 having the lubricating layer 80 is inserted into the reinforcing sheet member 81, and, as shown in FIG. 12, an assembly thereof is passed between a pair of rollers 82 and 83 so as to be formed integrally. Thus, a covering-layer forming member 84 is formed which is constituted of the other heat-resistant sheet member 11, the lubricating layer 80 containing the lubricating material coated on one surface of that other heat-resistant sheet member 11, and the other reinforcing sheet member 81 made from the metal wire net 12 disposed in the lubricating layer 80. The covering-layer forming member 84 thus obtained is wound around the outer peripheral surface of the tubular base member 17 with the lubricating layer 80 placed on the outer side, thereby fabricating a cylindrical preform 85, as shown in FIG. 13. This cylindrical preform 85 is placed in the die 27 and is subjected to compression forming in the same way as described above, thereby obtaining the spherical annular seal member 71.

Then, by appropriately selecting the thickness of the heat-resistant sheet members 11 used as the heat-resistant materials 2 and 75, the kind, wire diameter, and the degree of mesh of the wire of the metal wire nets 12 used as the reinforcing members 3 and 76, the thickness of the lubricating layer 80, the degree of pressure with respect to the cylindrical preform 85, and the like, it is possible to obtain the spherical annular seal member 71 which has the seal body 4 and the covering layer 77 and in which, in the seal body 4 and the covering layer 77, the reinforcing members 3 and 76 are contained at a rate of 15 to 80 wt. %, and the heat-resistant materials 2 and 75 and the lubricating material 74 are contained at a rate of 20 to 85 wt. %, and in which the heat-resistant materials 2 and 75 and the lubricating material 74 in the seal body 4 and the covering layer 77 have a density of 1.20 g/cm$^3$ to 2.00 g/cm$^3$.

The spherical annular seal member 71 has on the outer peripheral surface 73 of the seal body 4 the covering layer 77 in which the lubricating material 74, the heat-resistant material 75, and the reinforcing member 76 are integrated in mixed form. Further, the spherical annular seal member has the partially convex spherical surface 72 formed by the exposed surface of the covering layer 77 in which the surface 78 constituted by the reinforcing member 76 and the surface 79 constituted by the lubricating material 74 are present in mixed form. Therefore, in the same way as the spherical annular seal member 61, it is possible to ensure smoother sliding on the concave spherical surface portion 41 which is the mating member abutting against the partially convex spherical surface 72. Moreover, the surface 79 constituted by the lubricating material 74 at the exposed surface can be held by the surface 78 constituted by the reinforcing member 76. In addition, the transfer of the lubricating material 74 from the partially convex spherical surface 72 to the concave spherical surface portion 41 and the scraping of the lubricating material 74 transferred to the concave spherical surface portion 41 can be effected appropriately, with the result that it is possible to ensure smooth sliding over long periods of time. Furthermore, in the same way as the spherical annular seal member 1, the leakage of exhaust gases through the seal body 4 itself does not occur, and abnormal noise does not occur during sliding on the concave spherical surface portion 41 which is the mating member.

Alternatively, by using a manufacturing method similar to that for the spherical annular seal member 71, and by appropriately selecting the thickness of the heat-resistant sheet members 11 used as the heat-resistant materials 2 and 75, the kind, wire diameter, and the degree of mesh of the wire of the metal wire nets 12 used as the reinforcing members 3 and 76, the thickness of the lubricating layer 80, the degree of pressure with respect to the cylindrical preform 85, and the like, a spherical annular seal member may be formed which has the seal body 4 and the covering layer 77 and has an annular surface layer portion 91 with a thickness of 1 mm from the partially convex spherical surface 62 toward the center. In this annular surface layer portion 91, the reinforcing members 3 and 76 are contained at a rate of 60 to 75 wt. %, the heat-resistant materials 2 and 75 and the lubricating material 74 are contained at a rate of 25 to 40 wt. %, and the reinforcing members 3 and 76, the heat-resistant materials 2 and 75, and the lubricating material 74 in that annular surface layer portion 91 have a density of 3.00 g/cm$^3$ to 5.00 g/cm$^3$. In the remaining annular portion of the spherical annular seal member excluding the annular surface layer portion 91, the reinforcing member 3 is contained at a rate of 20 to 70 wt. %, and the heat-resistant material 2 is contained at a rate of 30 to 80 wt. %.

In such a spherical annular seal member, the exfoliation and coming off of the surface layer portion 91 are difficult to occur, and initial leakage of exhaust gases through the surface layer portion 91 does not occur. Moreover, the leakage of exhaust gases can be prevented not only in an early period but in a longer period, and the occurrence of abnormal noise can be prevented during sliding on the concave spherical surface portion 41 which is the mating member. In addition, the leakage of exhaust gases through the remaining annular portion can be prevented reliably, and reinforcement of the heat-resistant material in this portion is rendered satisfactory, satisfactorily preventing the exfoliation of the heat-resistant material.

Still alternatively, by using a manufacturing method similar to that for the spherical annular seal member 71, and by appropriately selecting the thickness of the other heat-resistant sheet member 11 used as the heat-resistant material 75, the kind, wire diameter, and the degree of mesh of the wire of the metal wire net 12 used as the reinforcing member 76, the thickness of the lubricating layer 80, and the like, a spherical annular seal member may be formed which has the seal body 4 and the covering layer 77 wherein, in the covering layer 77, the reinforcing member 76 is contained at a rate of 60 to 75 wt. %, and the lubricating material 74 and the heat-resistant material 75 are contained at a rate of 25 to 40 wt. %. In such a spherical annular seal member, the exfoliation and coming off of the portion of the covering layer 77 are difficult to occur, and it is possible to reliably prevent the initial and early leakage of exhaust gases through the portion of the covering layer 77.

In addition, by using a manufacturing method similar to that for the spherical annular seal member 71, and by appropriately selecting the thickness of the other heat-resistant sheet member 11 used as the heat-resistant material 75, the kind, wire diameter, and the degree of mesh of the wire of the metal wire net 12 used as the reinforcing member 76, the thickness of the lubricating layer 80, and the like, a spherical annular seal member may be formed which has the seal body 4 and the covering layer 77 wherein, in the partially convex spherical surface 72, the surface 78 constituted by the reinforcing member 76 is exposed at an area rate of 0.5 to 30%, and the surface 79 constituted by the lubricating material 74 is exposed at an area rate of 70 to 99.5%. In such a spherical annular seal member, the exfoliation and coming off of the surface 79 constituted by the lubricating material 74 at the partially convex spherical surface 72 can be prevented, and it is possible to obtain smooth sliding on the concave spherical surface portion 41 even in long periods of use.

Figure 14:
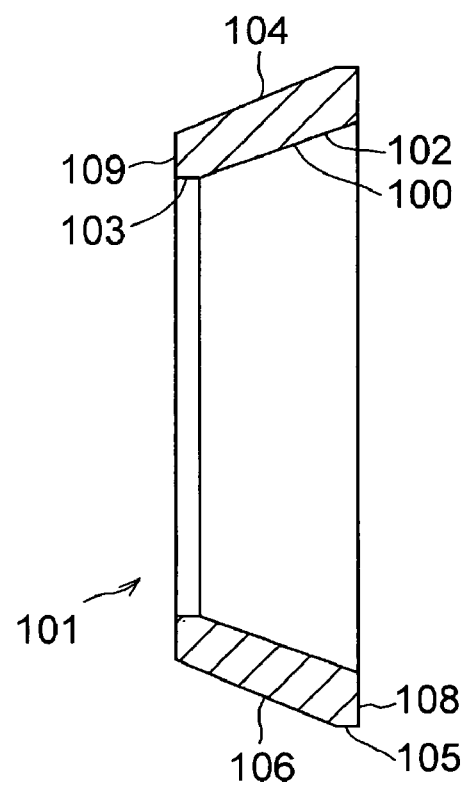
FIG. 14 is a vertical cross-sectional view illustrating a further embodiment of the spherical annular seal member in accordance with the invention.

Incidentally, the example of the spherical annular seal member 1, 61, or 71 has been described above which has the outer peripheral surface 10, 60, or 70 including the partially convex spherical surface 7, 62, or 72 as the annular sliding surface. Alternately, however, in the invention it is possible to use a spherical annular seal member 101 having an inner peripheral surface 100 including the a truncated conical surface 102 as the annular sliding surface, as shown in FIG. 14. In addition to the truncated conical surface 102, the spherical annular seal member 101 has the inner peripheral surface 100 including a cylindrical inner surface 103 continuing from the truncated conical surface 102; outer peripheral surfaces 106 including a truncated conical outer surface 104 corresponding to the truncated conical surface 102 as well as a cylindrical outer surface 105 continuing from the truncated conical outer surface 104; annular end faces 108 and 109 respectively provided on the large-diameter side and the small-diameter side of the truncated conical surface 102. The spherical annular seal member 101 is constructed in a manner similar to that for the spherical annular seal member 1, 61, or 71.

Figure 15:
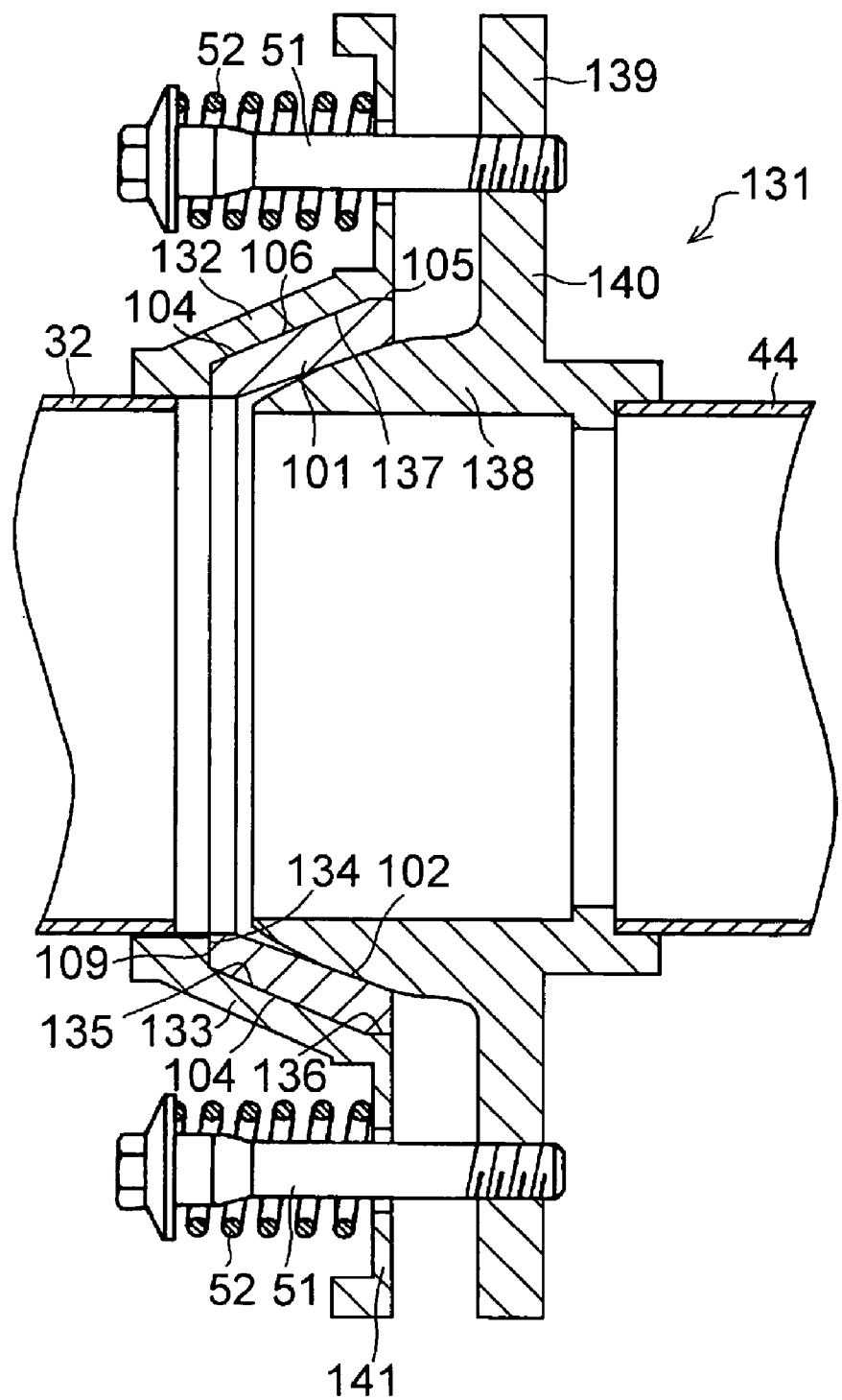
FIG. 15 is a vertical cross-sectional view of the exhaust pipe spherical joint in which the spherical annular seal member in accordance with the embodiment shown in FIG. 14 has been incorporated.

The spherical annular seal member 101 shown in FIG. 14 and having the inner peripheral surface 100 including the truncated conical surface 102 as the annular sliding surface is used by being incorporated in an exhaust pipe spherical joint 131 shown in FIG. 15, for example. That is, a flange member 134 is secured by such as welding to the outer peripheral surface of the upstream-side exhaust pipe 32 connected to the engine side. The end face 109, the truncated conical outer surface 104, and the cylindrical outer surface 105 of the outer peripheral surfaces 106 are respectively fitted exactly to inner peripheral surfaces 137 of the flange member 132, including an annular face 134, a truncated conical surface 135, and a cylindrical surface 136 of a truncated conical portion 133. The spherical annular seal member 101 is thus fitted at its outer peripheral surfaces 106. The downstream-side exhaust pipe 44 opposes the upstream-side exhaust pipe 32 and is connected to the muffler side. A convex spherical surface member 140 serving as the mating member integrally having a convex spherical surface portion 138 and a flange portion 139 is secured to the downstream-side exhaust pipe 44 by welding or the like. The downstream-side exhaust pipe 44 is disposed with the concave spherical surface portion 138 slidably abutting against the truncated conical surface 102 of the spherical annular seal member 101.

In the exhaust pipe spherical joint 131 shown in FIG. 15, the downstream-side exhaust pipe 44 is constantly urged resiliently toward the upstream-side exhaust pipe 32 by means of the pair of bolts 51 each having one end fixed to the flange portion 139 and another end arranged by being inserted in a flange portion 141 of the flange member 132 with a sufficient gap, and by means of the pair of coil springs 52 each arranged between the enlarged head of the bolt 51 and the flange portion 141. The exhaust pipe spherical joint 131 is arranged such that relative angular displacements occurring in the upstream- and downstream-side exhaust pipes 32 and 44 are allowed by sliding between the truncated conical surface 102 of the spherical annular seal member 101 and the concave spherical surface portion 138 of the convex spherical surface member 140 secured to the end of the downstream-side exhaust pipe 44 by welding or the like.

Since the spherical annular seal member 101 which is applied to such an exhaust pipe spherical joint 131 is constructed in the same way as the spherical annular seal member 1, 61, or 71, the spherical annular seal member 101 produces effects similar to those of the above-described spherical annular seal member 1, 61, or 71.

Figure 16:
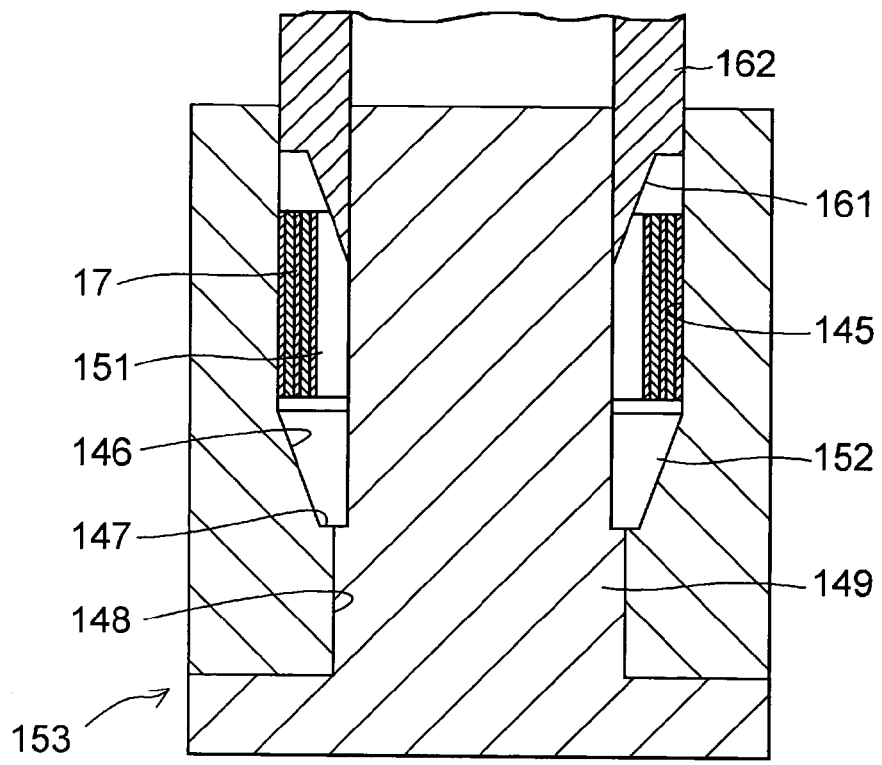
FIG. 16 is a vertical cross-sectional view illustrating a state in which the tubular base member is inserted in a die in the manufacturing process of the embodiment shown in FIG. 14.
Figure 17:
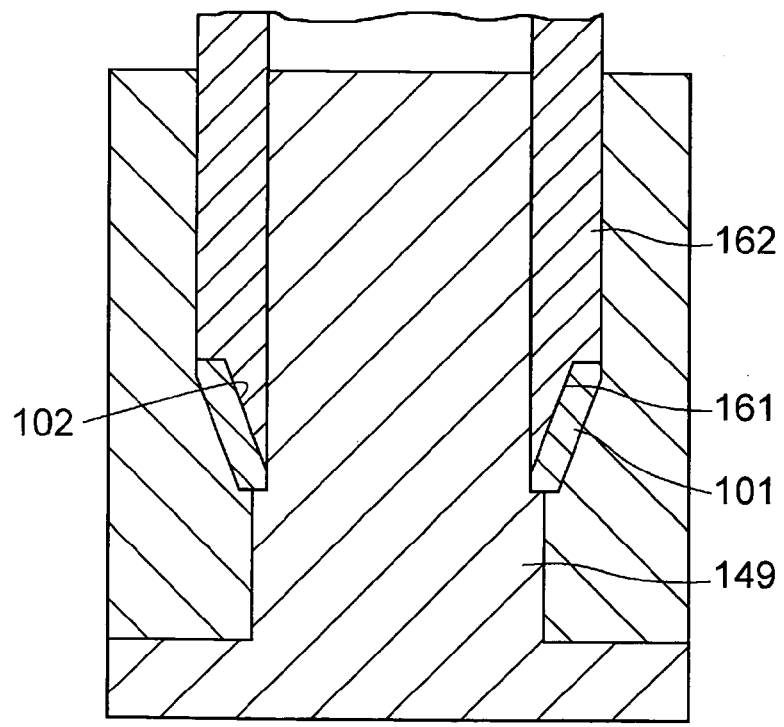
FIG. 17 is a vertical cross-sectional view illustrating a state of compression forming in the manufacturing process of the embodiment shown in FIG. 14.

To manufacture the spherical annular seal member 101 shown in FIG. 14 and corresponding to the spherical annular seal member 1 or 61, the strip-like heat-resistant sheet member 11 such as the one shown in FIG. 2 referred to earlier and the reinforcing sheet member 16 such as the one shown in FIG. 3 referred to earlier are first prepared. Next, the heat-resistant sheet member 11 and the reinforcing sheet member 16 are superposed one on top of the other, and this superposed assembly is convoluted with the heat-resistant sheet member 11 placed on the inner side such that heat-resistant sheet member 11 is convoluted with one more turn, thereby forming the tubular base member 17, as shown in FIG. 4. Further, a die 153 such as the one shown in FIG. 16 is prepared. The die 153 has a cylindrical inner wall surface 145, a truncated conical inner wall surface 146 continuing from the cylindrical inner wall surface 145, and a circular hole 148 continuing from a truncated conical surface 146 via a stepped portion 147. As a stepped core 149 is inserted in the through hole 148, a hollow cylindrical portion 151 and a truncated conical hollow portion 152 continuing from the hollow cylindrical portion 151 are formed inside the die 153. The tubular base member 17 is inserted in the hollow cylindrical portion 151, i.e., over the outer peripheral surface of the stepped core 149 of the die 153 so as to be fitted to the cylindrical inner wall surface 145. After the fitting of the tubular base member 17 to the cylindrical inner wall surface 145, a cylindrical pressing member 162 having a truncated conical surface 161 at its distal end portion, is inserted in the hollow cylindrical portion 151 of the die 153, as shown in FIG. 16. Then, as shown in FIG. 17, the tubular base member 17 is subjected to compression forming with a predetermined pressure in the direction of the core axis, thereby forming the seal body. By using this seal body as it is, the spherical annular seal member 101 such as the one shown in FIG. 14 and corresponding to the spherical annular seal member 1 is obtained. Then, the inner peripheral surface of the seal body obtained after the compression forming of the tubular base member 17 by the pressing member 162 is coated with the lubricating material by means of brushing, roller coating, spraying, or the like. After the lubricating material thus applied is dried, the exposed surface of this coated layer is smoothed to form a covering layer by the truncated conical surface 102 constituted by such a smooth exposed surface, thereby making it possible to obtain the spherical annular seal member 101 shown FIG. 14 and corresponding to the spherical annular seal member 61.

To manufacture the spherical annular seal member 101 shown in FIG. 14 and corresponding to the spherical annular seal member 71, the covering-layer forming member 84 such as the one shown in FIG. 12 referred to earlier is convoluted with the surface of its lubricating layer 80 placed on the inner side, thereby forming a tubular base member similar to the tubular base member 17. The other reinforcing sheet member 16 made from the strip-like metal wire net such as the one shown in FIG. 3 referred to earlier is superposed on the other heat-resistant sheet member 11 containing the heat-resistant material such as the one shown in FIG. 2 referred to earlier. This superposed assembly is wound around an outer peripheral surface of the tubular base member 17 constituted by the covering-layer forming member 84, thereby forming a cylindrical preform similar to the cylindrical preform 85. In the same way as described above, this cylindrical preform is inserted in the hollow cylindrical portion 151, i.e., over the outer peripheral surface of the stepped core 149 of the die 153 shown in FIG. 16, so as to be fitted to the cylindrical inner wall surface 145. Then, as shown in FIG. 17, the cylindrical preform is subjected to compression forming with a predetermined pressure in the direction of the core axis by the pressing member 162 inside the die 153, as thereby obtaining the spherical annular seal member 101.

Figure 18:
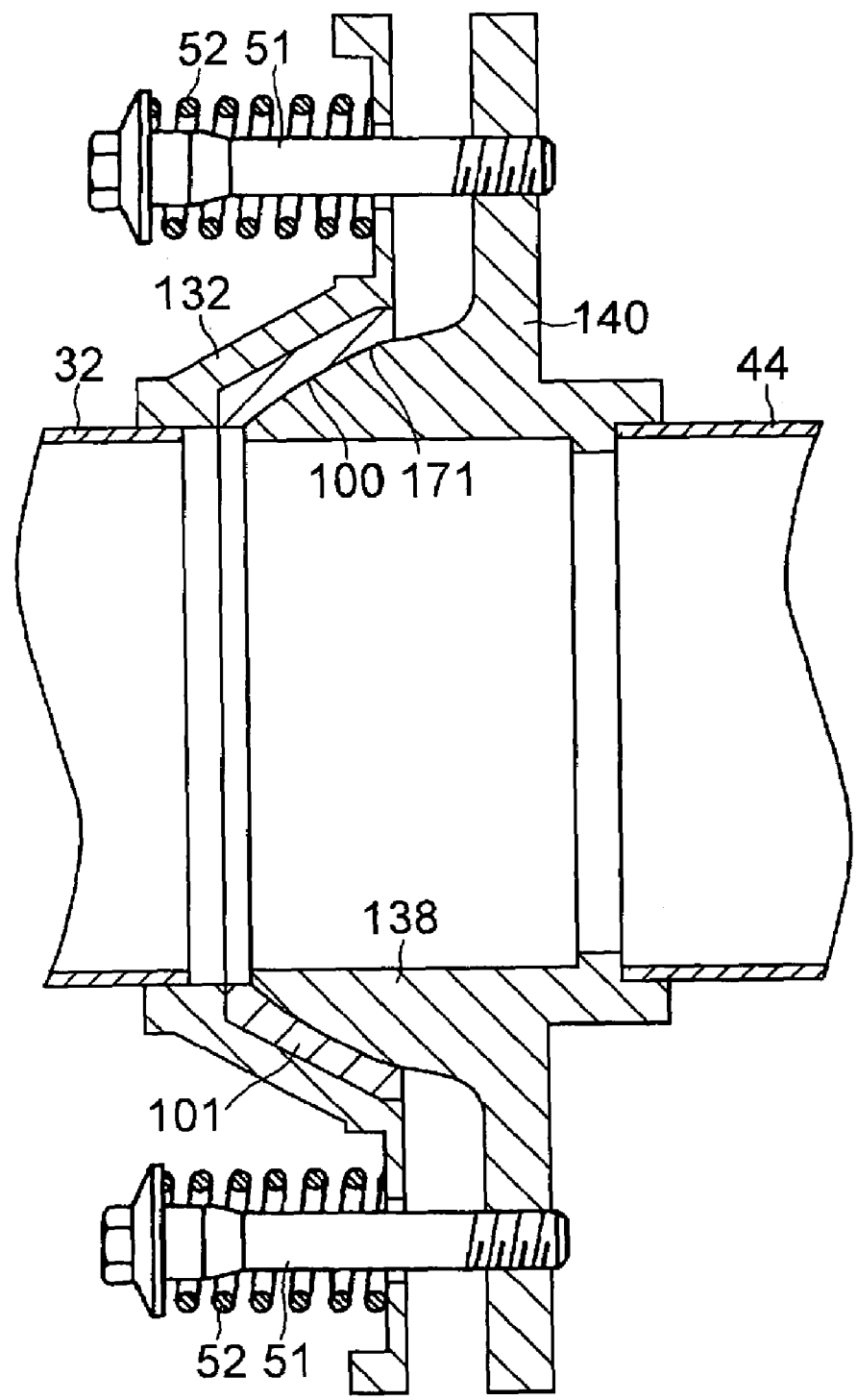
FIG. 18 is a vertical cross-sectional view of the exhaust pipe spherical joint in which the spherical annular seal member in accordance with a still further embodiment has been incorporated.

Incidentally, in the spherical annular seal member 101, the arrangement provided is such that the annular sliding surface of the inner peripheral surface 100 is formed by the truncated conical surface 102, and the convex spherical surface portion 138 is made to slidably abut against a portion of the truncated conical surface 102 at one location. Alternatively, an arrangement may be provided such that, as shown in FIG. 18, the annular sliding surface of the inner peripheral surface 100 is formed by a partially concave spherical surface 171, and the convex spherical surface portion 138 is made to slidably abut against a substantially entire area of the partially concave spherical surface 171. Still alternatively, an arrangement may be provided such that, as shown in FIG. 19, the annular sliding surface of the inner peripheral surface 100 is formed by two continuous truncated conical surfaces 172 and 173, and the convex spherical surface portion 138 is made to slidably abut against the truncated conical surfaces 172 and 173 partially at two locations.

Figure 19:
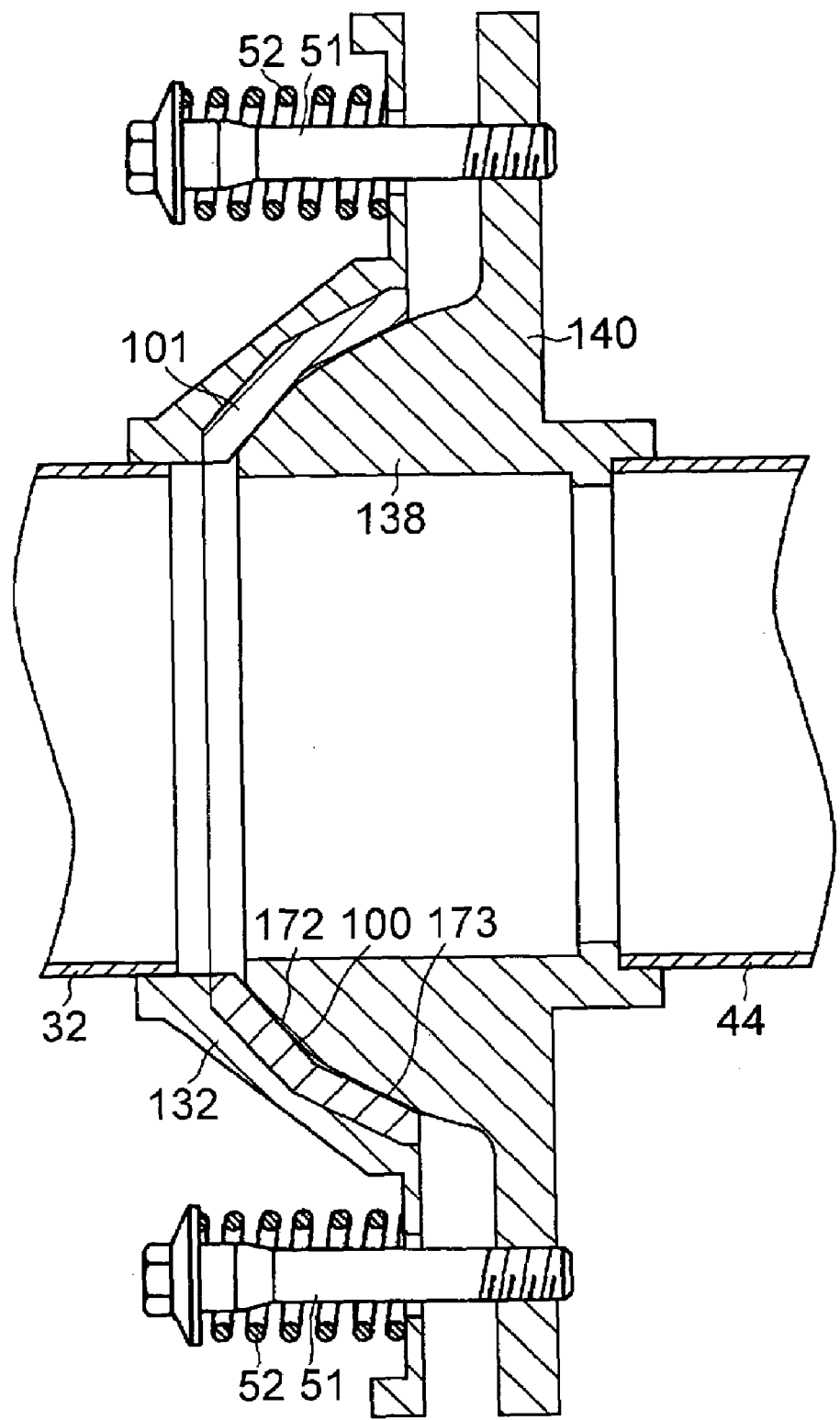
FIG. 19 is a vertical cross-sectional view of the exhaust pipe spherical joint in which the spherical annular seal member in accordance with a further embodiment has been incorporated.

Since the spherical annular seal members 101 shown in FIGS. 18 and 19 are constructed in a manner similar to that for the spherical annular seal member 1, 61, or 71, it is possible to produce effects similar to those of the above-described spherical annular seal member 1, 61, or 71.

The invention claimed is:

1. A spherical annular seal member comprising:
   a seal body which has an annular sliding surface and in which at least a heat-resistant material and a reinforcing member made of a metal wire have been compressed to fill meshes of the metal wire net of said reinforcing member with said heat-resistant material such that said heat-resistant material and said reinforcing member are integrally formed in mixed form,
   wherein said reinforcing member and said heat-resistant material are respectively contained at a rate of 15 to 80 wt. % and at a rate of 20 to 85 wt. %, and said heat-resistant material in said seal body has a density of 1.20 g/cm$^3$ to 2.00 g/cm$^3$.

2. A spherical annular seal member comprising:
   a seal body which has an annular sliding surface and in which at least a heat-resistant material and a reinforcing member made of a metal wire have been compressed to fill meshes of the metal wire net of said reinforcing member with said heat-resistant material such that said heat-resistant material and said reinforcing member are integrally formed in mixed form; and
   a covering layer formed integrally with an outer peripheral surface of said seal body and formed of at least a lubricating material, said annular sliding surface being formed by an exposed surface of said covering layer,
   wherein, in said seal body and said covering layer, said reinforcing member is contained at a rate of 15 to 80 wt. %, and said heat-resistant material and said lubricating material are contained at a rate of 20 to 85 wt. %, and
   wherein said heat-resistant material and said lubricating material in said seal body and said covering layer have a density of 1.20 g/cm$^3$ to 2.00 g/cm$^3$.

3. A spherical annular seal member comprising:
   a seal body which has an annular sliding surface and in which at least a heat-resistant material and a reinforcing member made of a metal wire have been compressed to fill meshes of the metal wire net of said reinforcing member with said heat-resistant material such that said heat-resistant material and said reinforcing member are integrally formed in mixed form; and
   a covering layer formed integrally with an outer peripheral surface of said seal body and formed such that at least a lubricating material, a heat-resistant material and a reinforcing member made of a metal wire have been compressed to fill meshes of the metal wire net of said reinforcing member with said lubricating material and said heat-resistant material such that said lubricating material, said heat-resistant material, and said reinforcing member are integrally formed in mixed form, said annular sliding surface being formed by an exposed surface of said covering layer in which a surface constituted by said reinforcing member and a surface constituted by said lubricating material are present in mixed form,
   wherein, in said seal body and said covering layer, said reinforcing member is contained at a rate of 15 to 80 wt. %, and said heat-resistant material and said lubricating material are contained at a rate of 20 to 85 wt. %, and
   wherein said heat-resistant material and said lubricating material in said seal body and said covering layer have a density of 1.20 g/cm$^3$ to 2.00 g/cm$^3$.

4. A spherical annular seal member comprising:
   a seal body which has an annular sliding surface and in which at least a heat-resistant material and a reinforcing member made of a metal wire have been compressed to fill meshes of the metal wire net of said reinforcing member with said heat-resistant material such that said heat-resistant material and said reinforcing member are integrally formed in mixed form; and
   a covering layer formed integrally with an outer peripheral surface of said seal body and formed such that at least a lubricating material, a heat-resistant material and a reinforcing member made of a metal wire have been compressed to fill meshes of the metal wire net of said reinforcing member with said lubricating material and said heat-resistant material such that said lubricating material, said heat-resistant material, and said reinforcing member are integrally formed in mixed form, said annular sliding surface being formed by an exposed surface of said covering layer in which a surface constituted by said reinforcing member and a surface constituted by said lubricating material are present in mixed form,
   wherein, in an annular surface layer portion of said spherical annular seal member with a thickness of 1 mm from the annular sliding surface, said reinforcing member is contained at a rate of 60 to 75 wt. %, said heat-resistant material and said lubricating material are contained at a rate of 25 to 40 wt. %, and said reinforcing member, said heat-resistant material, and said lubricating material in said annular surface layer portion have a density of 3.00 g/cm$^3$ to 5.00 g/cm$^3$, and
   wherein, in a remaining annular portion of the spherical annular seal member excluding said annular surface layer portion, said reinforcing member is contained at a rate of 20 to 70 wt. %, and said heat-resistant material is contained at a rate of 30 to 80 wt. %.

5. A spherical annular seal member comprising:

a seal body which has an annular sliding surface and in which at least a heat-resistant material and a reinforcing member made of a metal wire have been compressed to fill meshes of the metal wire net of said reinforcing member with said heat-resistant material such that said heat-resistant material and said reinforcing member are integrally formed in mixed form; and a covering layer formed integrally with an outer peripheral surface of said seal body and formed such that at least a lubricating material, a heat-resistant material and a reinforcing member made of a metal wire have been compressed to fill meshes of the metal wire net of said reinforcing member with said lubricating material and said heat-resistant material such that said lubricating material, said heat-resistant material, and said reinforcing member are integrally formed in mixed form, said annular sliding surface being formed by an exposed surface of said covering layer in which a surface constituted by said reinforcing member and a surface constituted by said lubricating material are present in mixed form, wherein, in said covering layer, said reinforcing member is contained at a rate of 60 to 75 wt. %, and said heat-resistant material and said lubricating material are contained at a rate of 25 to 40 wt. %.

6. A spherical annular seal member comprising:

a seal body which has an annular sliding surface and in which at least a heat-resistant material and a reinforcing member made of a metal wire have been compressed to fill meshes of the metal wire net of said reinforcing member with said heat-resistant material such that said heat-resistant material and said reinforcing member are integrally formed in mixed form; and a covering layer formed integrally with an outer peripheral surface of said seal body and formed such that at least a lubricating material, a heat-resistant material and a reinforcing member made from a compressed metal wire have been compressed to fill meshes of the metal wire net of said reinforcing member with said lubricating material and said heat-resistant material such that said lubricating material, said heat-resistant material, and said reinforcing member are integrally formed in mixed form, said annular sliding surface being formed by an exposed surface of said covering layer in which a surface constituted by said reinforcing member and a surface constituted by said lubricating material are present in mixed form, wherein, in said annular sliding surface, said surface constituted by said reinforcing member is exposed at an area rate of 0.5 to 30%, and said surface constituted by said lubricating material is exposed at an area rate of 70 to 99.5%.

7. The spherical annular seal member according to claim 1, wherein said heat-resistant material contains expanded graphite.

8. The spherical annular seal member according to claim 1, wherein said annular sliding surface includes a partially convex spherical surface, a partially concave spherical surface, or a truncated conical surface.

9. The spherical annular seal member according to claim 1, comprising an outer peripheral surface including said annular sliding surface.

10. The spherical annular seal member according to claim 1, comprising an inner peripheral surface including said annular sliding surface.

* * * * *